SEYMOUR EPSTEIN
ROGER BIHLER
INVENTORS

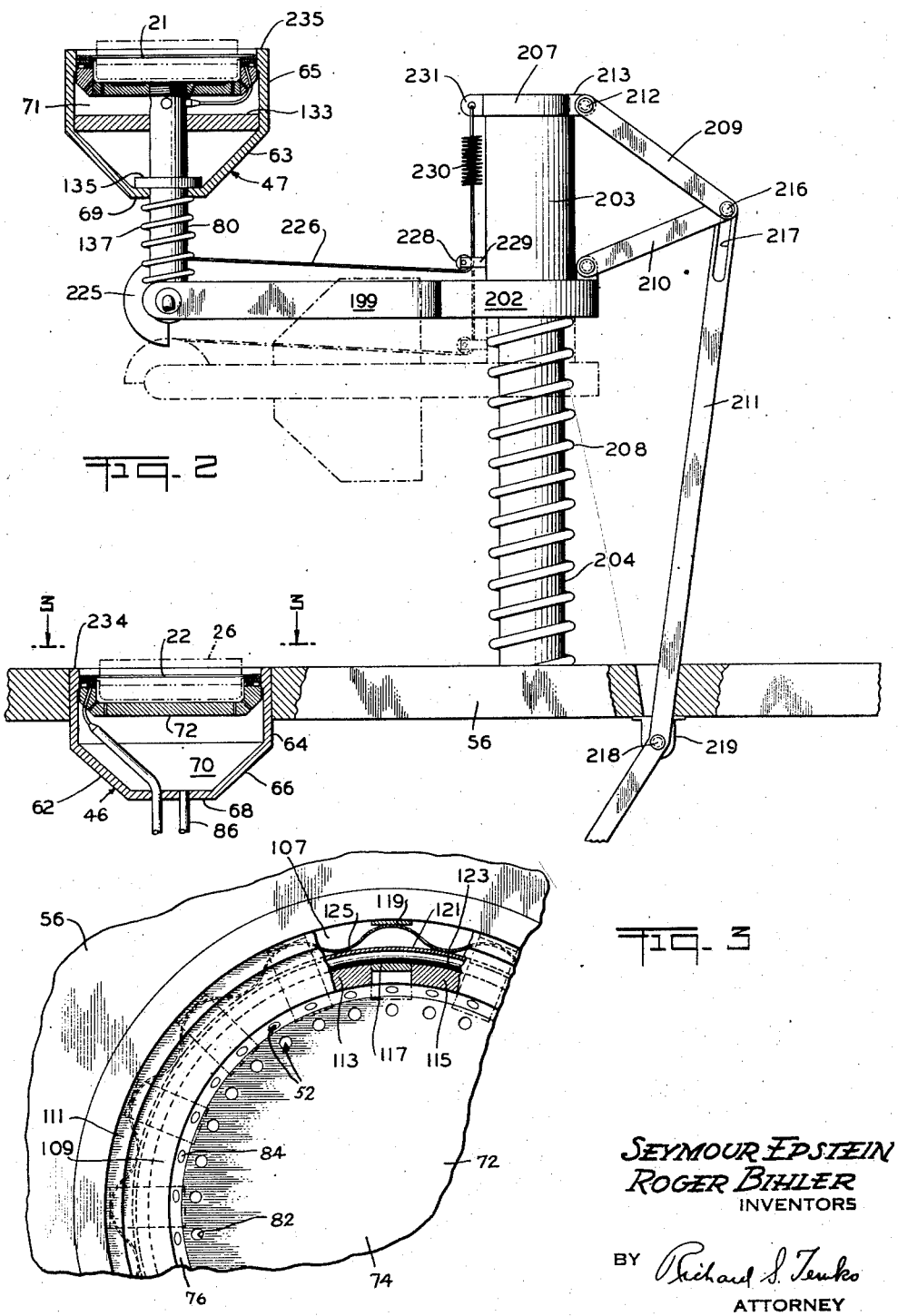

Oct. 11, 1949.  S. EPSTEIN ET AL  2,484,336
APPARATUS FOR MAKING POWDER PUFFS
Filed Nov. 9, 1946  5 Sheets-Sheet 3

SEYMOUR EPSTEIN
ROGER BIHLER
INVENTORS

BY Richard S. Tenko
ATTORNEY

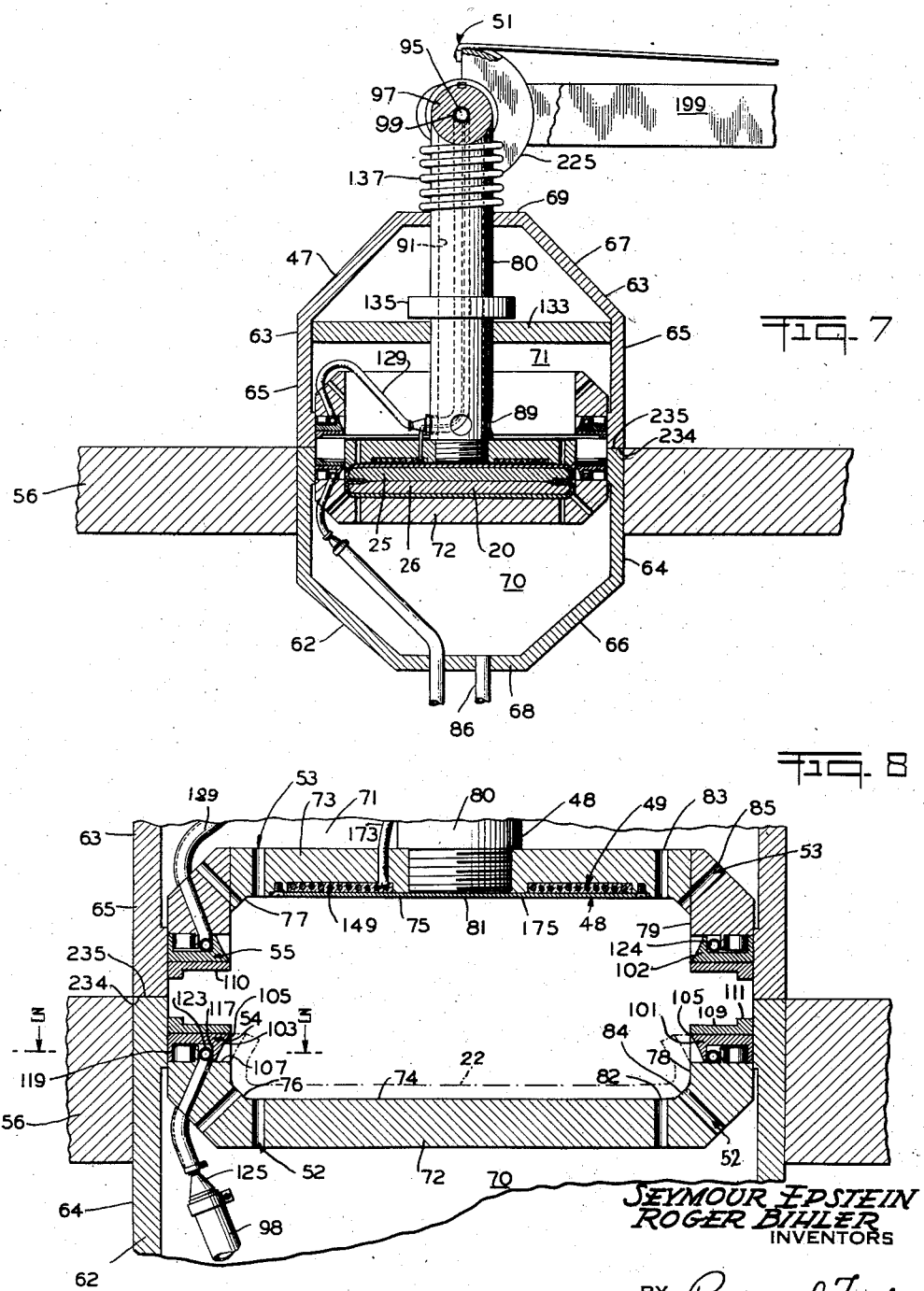

Oct. 11, 1949.   S. EPSTEIN ET AL   2,484,336
APPARATUS FOR MAKING POWDER PUFFS
Filed Nov. 9, 1946   5 Sheets-Sheet 5

SEYMOUR EPSTEIN
ROGER BIHLER
INVENTORS

BY Richard S. Temko
ATTORNEY

Patented Oct. 11, 1949

2,484,336

UNITED STATES PATENT OFFICE 2,484,336

APPARATUS FOR MAKING POWDER PUFFS

Seymour Epstein, New York, and Roger Bihler, Brentwood, N. Y.

Application November 9, 1946, Serial No. 709,070

13 Claims. (Cl. 154—1.8)

This invention relates generally to the manufacture of hollow articles made by the integration of blanks of planar material and more particularly to powder puffs and methods and means of making the same.

For the application of face powder and for similar uses powder puffs composed of a textile material casing having a tufted or chenille outer surface are in wide use. In accordance with prior art constructions and methods the casings are manufactured by taking two blanks and stitching the same together incompletely about the perimeters thereof to form an inside out pocket. A padding or stuffing is provided and the pocket is manually turned right side out by the use of a turning stick or similar projection. After the pocket is turned the open edges are manually connected by stitching or cement. Such construction and methods are subject to several disadvantages. Many of the pockets are damaged in the turning operation. It is difficult to place the stuffing within the pocket so that it lies smoothly. The total number of operations is great with a consequent high labor cost. The turning operation puts the cloth of the casing under excessive strain resulting in many damaged puffs or the use of a heavier material with resultant higher cost. The separate closing of a portion of the edge of the puff casing usually results in a lack of uniformity of the edge and the puckered appearance of the last closed portion detracts from the appearance of the entire puff.

It is therefore, among the objects of the present invention to provide novel and useful powder puff constructions and methods of making same which avoid the above described disadvantages of the prior art.

Another object herein lies in the provision of powder puff construction wherein the inturned edges of the casing are simultaneously interconnected in an adhesive manner.

Another object lies in the provision of powder puffs wherein the padding or stuffing is in a laminar arrangement with separate laminations engaged by the casing connection members of each of the separate casing elements.

Another object herein lies in an improved powder puff having greater durability and shape retaining characteristics.

Another object herein lies in the provision of new methods, and steps therein, in the production of powder puffs of the class described.

Another object herein lies in the provision of novel and useful means for the production of powder puffs of the class described wherein a large proportion of the operations are automatically performed, and which means may be manipulated by a single operator having a relatively low degree of skill.

The invention in the apparatus or means for the production of the powder puffs is claimed in the present application, and the invention in the powder puff construction and the method for producing the same is claimed in our divisional co-pending application, Serial No. 63,593, filed December 4, 1948.

These objects and other incidental ends and advantages will more fully appear in the progress of this disclosure and be pointed out in the itemed claims.

In the drawings in which similar reference characters designate corresponding parts throughout the several views:

Fig. 2 is an enlarged fragmentary elevational view, partly in section as seen from the right of Fig. 1.

Fig. 3 is a fragmentary plan view as seen from the plane 3—3 on Fig. 2.

Fig. 7 is an enlarged fragmentary detailed sectional view corresponding to the lower left hand portion of Fig. 4.

Fig. 8 is an enlarged fragmentary vertical sectional view showing details of a lower portion of Fig. 7 with the puff removed.

Figure 1:
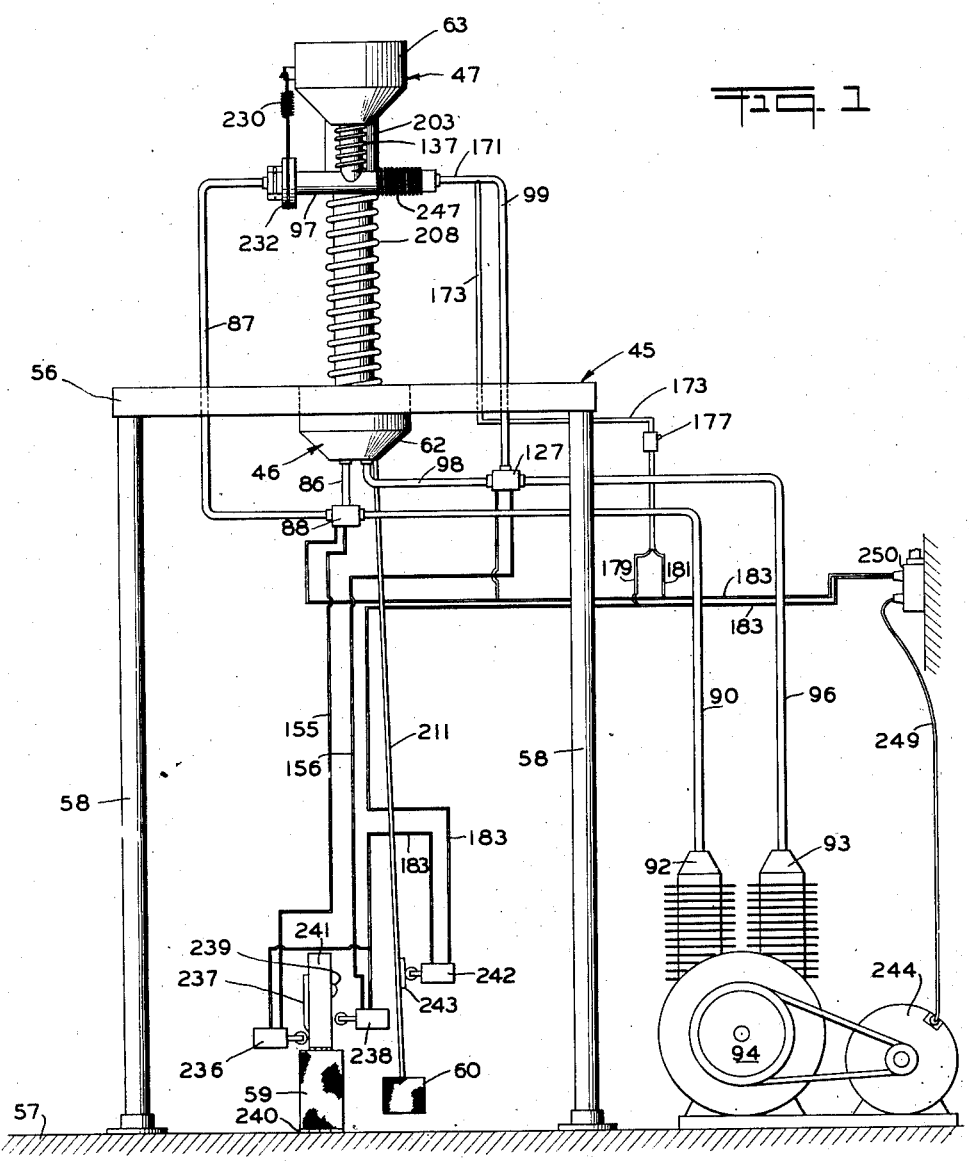
Fig. 1 is a front elevational view of a machine, an embodiment of the invention, utilizing the present method of manufacturing powder puffs.

In accordance with the invention a powder puff 20 is manufactured by first taking two casing elements, 21 and 22 and placing upon the inner surfaces 23 and 24 thereof pad elements 25 and 26 respectively. Preferably prior to this last described assembly, or simultaneously with the original blanking of an element such as the element 21 from the web of planar material 27 the periphery 29 is provided with a plurality of notches 31. The element 22 has the periphery 30 thereof provided with similar notches 32. The notches 31 and 32 are preferably V-shaped and the edges thereof converge toward the center at points substantially equidistant with respect to said center. The notches therefore form the tabs 33 and 34. The circle along which said points of convergence lie is approximately of the same diameter as the finished puff.

Figure 4:
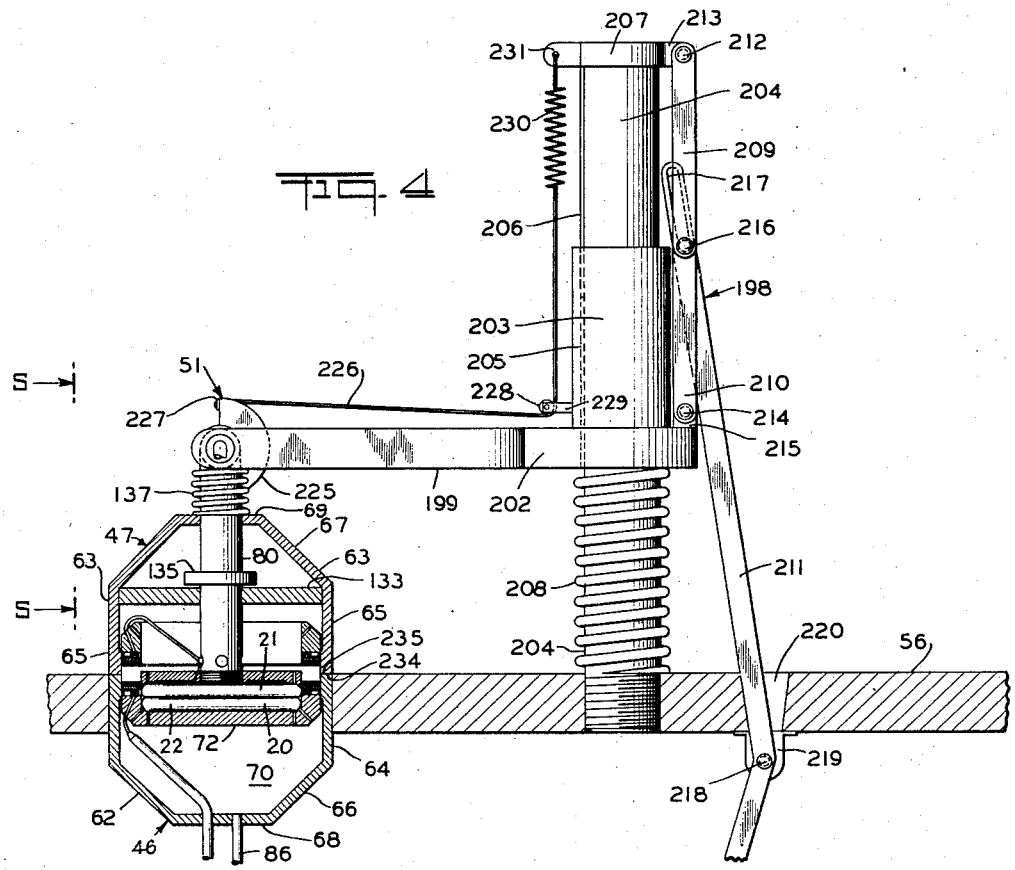
Fig. 4 is a side elevational view partly in section, and corresponding generally to Fig. 2, by showing the parts in an altered position thereof.
Figures 5, 6:
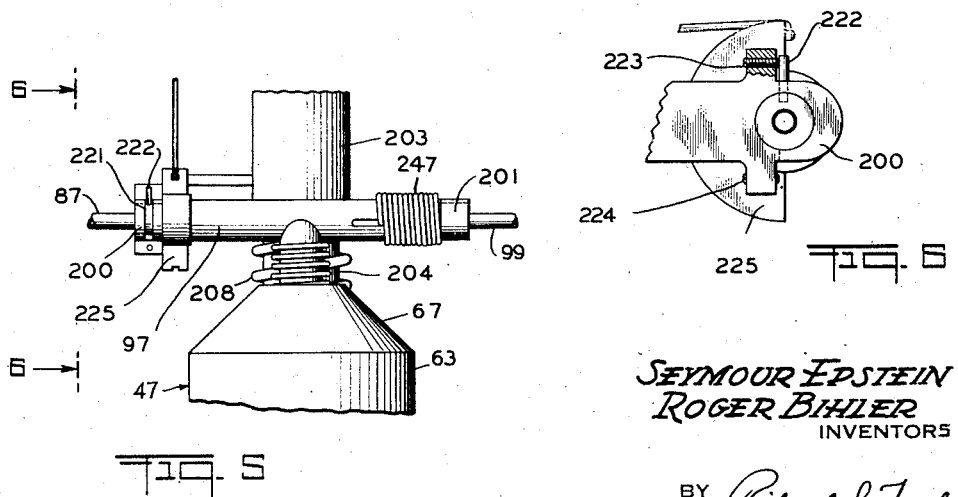
Fig. 5 is a fragmentary front elevational view as seen from the plane 5—5 on Fig. 4.
Fig. 6 is an enlarged fragmentary side elevational view as seen from the plane 6—6 on Fig. 5.
Figure 9:
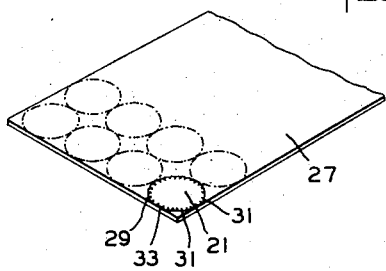
Fig. 9 is a perspective view, schematic in nature, showing a web of material after one blanking operation and illustrates a first step in the present method.
Figure 10:
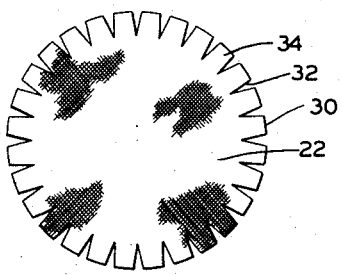
Fig. 10 is a plan view of a single puff casing element showing a second step in present method.
Figure 12:
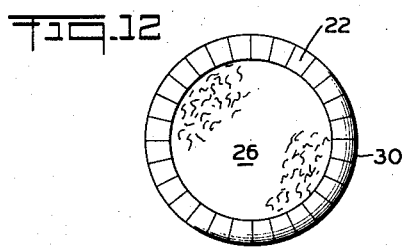
Fig. 12 is a plan view of a casing element the edge of which is folded over a pad element in a fourth step in the present method.
Figure 11:
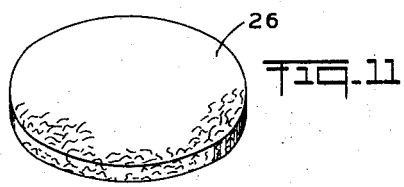
Fig. 11 is a view in perspective of a pad in a third step of the present method.
Figure 13:
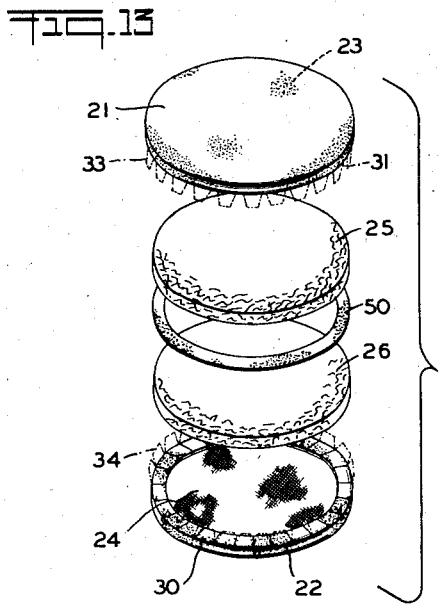
Fig. 13 is an exploded view of a puff in accordance with the present invention.

Thus, the puff 20 may be formed by taking an element 22 with the normally outer surface downward (see Fig. 13) so that in the case of a plush type puff, the pile extends downwardly and outwardly. Following this a pad element 26 is placed upon the surface 24 and then the tabs 34 are folded inwardly through the dot dash position of Fig. 13 to take the position shown in Fig. 13 in full lines. The element 21 has the pad element 25 placed against the surface 23 and the tabs 33 are folded inwardly. Following this a layer of adhesive 50, indicated schematically in Fig. 13, is placed between the juxtaposed surfaces of the tabs 33 and 34. The adhesive 50 may be of any suitable type such as one containing an air drying solvent or may be one which is thermoplastic or thermo-setting. The finished puff will appear in elevation as seen in Fig. 4, and in section as seen in Fig. 7.

Figure 14:
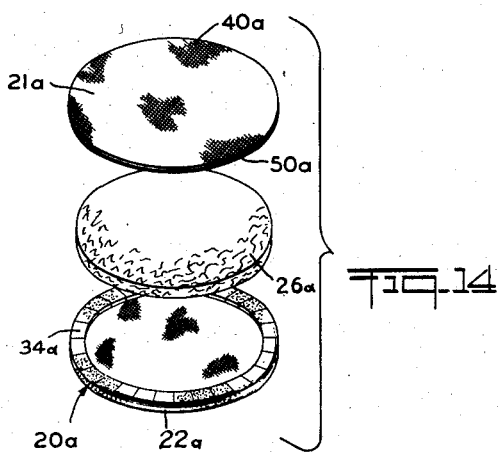
Fig. 14 is a view corresponding to Fig. 13 showing a second form of puff.

In Fig. 14 another form of puff is shown which differs from that just described, in that the casing element 21 and the pad element 25 are omitted and have substituted therefor a back element 40a. The other parts being similar to those previously described, to avoid needless repetition, are given the same reference characters with the addition of the suffix "a." In the form of puff shown in Fig. 14, the adhesive may be provided in the form of a layer 50a lying on the under surface of the back element 40a.

Figure 15:
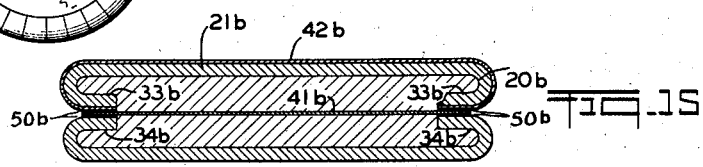
Fig. 15 is a vertical sectional view of a powder puff showing a third form thereof.

Another form of puff made in accordance with our invention is shown in Fig. 15 where a reinforcing element 41b is interposed between the tabs 33b and 34b. Also a handle strap 42b is engaged between the element 41b and the tabs 33b. The reinforcing element 41b may be secured in place by layers of adhesive 50b, or it may be a piece of fabric having a coating, on both surfaces thereof, of an adhesive material.

Any suitable type of adhesive material may be used in any of the adhering operations of assembly. Thus, we may use water soluble glues. The drying of these may be hastened by solvents of higher volatility such as alcohol. We can use natural or synthetic rubber cement. We have used cements which contain synthetic resins, for example of the vinyl polymer type. For adhesion through the use of heat, cements containing gutta percha have been found satisfactory. Obviously, the composition of the cement will vary with the nature of the materials being united, and with the means for producing setting.

The puffs 20, 20a and 20b produced as described have a pleasing appearance and durable construction. Since all of the perimeter of the puff is simultaneously integrated, undesirable irregularities and puckering are avoided. The puffs being made in a right side out manner require no damaging turning and are closed in a substantially single operation. Since the adhesive forms a flexible weld with the tabs and acts, where a sufficient quantity of adhesive is used, to interconnect these to form a kind of ring, this retains the waist or pulled in portion around the edge of the puff in place and causes a uniform appearance thereof. This effect is even more pronounced in the form shown in Fig. 15.

The machine for manufacturing the powder puffs in accordance with the present invention has the details thereof shown in Figs. 1 to 8 inclusive. The machine generally indicated by reference character 45 comprises broadly: a first or bottom puff forming element 46; and a second or top forming element 47; a puff pressing element 48; heating means 49; second puff forming element inverting means 51; first and second casing element holding means 52 and 53; and first and second casing element periphery bending or tipping means 54 and 55.

The machine is preferably mounted upon a base 56 which is slightly below normal table height for a seated operator. Thus the base 56 may be supported from a floor 57 upon legs 58. Such a positioning permits the operator to conveniently place powder puff components within the elements 46 and 47 simultaneously. The main operating pedals 59 and 60 are placed in a position convenient for foot actuation on the part of the operator.

The first and second elements 46 and 47 are in many respects substantially identical so that a detailed description of portions of one will suffice for the other. For clarity in the disclosure, a part on the first element 46 has an even ordinal and the corresponding part on the element 47 will have the next odd ordinal as a reference character.

The elements 46 and 47 have cup shaped housings 62 and 63 with cylindrical side walls 64 and 65. Extending from the walls 64 and 65 are frusto-conical walls 66 and 67 which merge with the bottom or end walls 68 and 69 respectively. The housings 62 and 63 therefore form chambers 70 and 71, the principal openings of which are closed by the die elements 72 and 73.

The die elements 72 and 73 are generally of shallow cup shape and considering such cups as occupying a position shown in Fig. 8 have a bottom wall 74 and a top wall 75, an angular circular wall 76 and 77, and side cylindrical walls 78 and 79, respectively. The die element 72 is fixedly secured to the inner surface of the side wall 64 in any suitable manner as by the use of screws which extend through the wall 64 and enter the wall 78, said screws not being illustrated for the purpose of clarity. The wall 79 including the second bending or tipping means 55 generally is fixedly secured to the wall 65 in a manner similar to that used for securing wall 78 as described above. The top wall 75 and the angular wall 77 are integral and are movable as a unit with respect to the wall 79. Together the walls 75 and 77 form a piston or pressure head 81 which is connected to the relatively free or outer end of the hollow piston rod 80.

As best seen in Fig. 8, the wall 74 is provided with an annular row of air holes 82, and the angular wall 76 has another annular row of air holes 84. Similarly, the top wall 75 has an annular row of air holes 83 and the angular wall 77 has an annular row of air holes 85. The holes 85 extend through the stationary and movable parts thereof so that when the pressure head 81 moves down the air flow through the holes 85 is cut off. We have found this to be satisfactory, but where a more continuous hold upon the puff casing element is desired the holes 85 may, extend instead, vertically through the head 81.

The air holes 82 and 84 communicate with the chamber 70, and thence through the suction line 86, through the valve 88 to the main vacuum line 90, going to the reduced pressure tank 92 on the low side of the compressor 94. Similarly, the air holes 83 and 85 communicate with the chamber 71. The suction circuit from the chamber 71 continues through the orifices 89, through the hollow bore 91 of the piston rod 80, to the left through the axial bore 95 of the axle 97 and thence through the flexible tube 87 which as seen in Fig. 1 connects with the valve 88.

The means 54 and 55 for bending or tipping the periphery of the casing elements 22 and 21 respectively, include a plurality of fingers 101 and 102 which are arranged in a circular fashion and are adapted for reciprocal movement radially with respect to the axes of their respective die elements 72 and 73. Since all of the fingers 101 and 102 are substantially identical, a detailed description of one will suffice for all. Any finger, 101 has a sloping front wall 103 forming a lip 105. The bottom surfaces of the finger 101 rest upon the surface 107 of the wall 78. The upper surface of the finger 101 is maintained in position by the under surface of the guide ring 109, the latter having the guide shoulder 111. Laterally thereof, the finger 101 is supported between an adjacent pair of finger vertical guides, 113 and 115 which project up from the surface 107. The finger 101 is indented on the under surface thereof to form front and rear depending projections 117 and 119. An annular flange 121 projects upwardly from the surface 107 and extends into the depression in the under surface of the finger 101. This forms two annular chambers; the forward one of which is occupied by an expansive tube 123 and the rear one of which is occupied by a resilient member 125. The resilient member 125 may take the form of a serpentine spring and it is preferably discontinuous so that it may lengthen when compressed by the expansive action of the tube 123. Normally the finger 101 is maintained in its retracted inactive position thereof by the spring 123. Fluid pressure in the tube 123 expands the chamber between the flange 121 and the projection 117 so as to advance the finger into an active position thereof shown in dot dash lines, for example, in Fig. 8. The fluid pressure may be pneumatic or hydraulic and in the example shown is pneumatic, the air under pressure traveling from the high side 93 of the compressor 94, through the pressure line 96, valve 127, the tube 98 and the flexible tube 99. Suitable coupling devices 125 may be used to transmit the pressure to the tube 123. In going to the expansive tube 124, the air under pressure travels through the flexible tube 99 through the right hand portion of the axle 97, down through the bore 91, out through one of the openings 89 and thence via the flexible tube 129.

Because the tube 129 is flexible, sufficient slack is allowed so that the piston 80 may reciprocate within the bearings in the strut 133 and the wall 69. The collar 135 in abutting against the inner surface of the wall 69 acts as a stop for movement of the piston 80 out of the element 47. This motion is of course relative since the expansive spring 137 urges the housing 63 away from the axle 97. The head 81 contains the heating means 49 which may be of any suitable type as, for example, an electrical resistance coil 149. The coil 149 may be removed and replaced by removal and replacement of the plate 175 forming a portion of the wall 75. Electrical energy may be supplied to the resistor 149 by the conductors 173 which pass up through one of the holes 89, through the bore 91 and at one portion through the flexible tube 99 as it goes through the right hand portion of the axle 97. Sufficient clearance exists through the tube 99 in the portion 171 for the passage of air so that it bypasses the conductors 173. The conductors 173 are connected to the switch 177 whence they are connected to the conductors 179 and 181, in turn connected to the conductors 183. Conductors 183 are connected to the source of electrical power 250.

The spring 247 urges the axle 97 to rotate in a counter-clockwise direction as viewed in Figure 4. The spring 247 is connected at its ends to said axle and the carriage 199.

The axle 97 is rotatably journaled in the bearings 200 and 201 at the outer ends of a bifurcated element 202 forming a part of the carriage 199. The element 202 is slideably mounted for vertical reciprocation by its integral sleeve 203 which rides upon the standard 204. The sleeve 203 has a groove 205 which is in engagement with the spline or key 206 secured to the forward surface of the standard 204. The carriage 199 is urged as a unit against the upper detent 207 by the compression spring 208 which forms the main elevating means for the carriage 199. The carriage 199 is moved downwardly upon the upright standard 204 by the means 198 for moving the carriage toward the element 46. The means 198 may be of any suitable character such as pneumatic, hydraulic or mechanical. We have shown by way of example a toggle including the levers 209, 210 and 211. The lever 209 at the upper end thereof is pivotally connected by the pin 212 to an extension 213 from the detent 207. The extension 213 extends rearwardly of the device. The lower end of the lever 210 is pivotally connected by a pin 214 upon an upward extension 215 integral with the rear portion of the element 202. The juxtaposed ends of the levers 209 and 210 are pivotally interconnected, and slideably connected to the upper end of the lever 211 by the pin 216 which rides within the slot 217. The lever 211 is pivotally mounted by the pin 218 upon the bearing 219, the latter being suspended from the lower surface of the base 56. The upper arm of the lever 211 penetrates the base 56 through the opening 220. The lower end of the lever 211 is provided with the pedal 60. The arrangement of the parts is such that when the operator moves the pedal 60 a sufficient distance rearwardly of the device, the levers 209 and 210 take the position shown in Fig. 4, while upon release of pressure from the pedal 60 the spring 208 urges the parts to the positions shown in Fig. 2. The pedal 60 may be aided in its movement toward its forward position by well known booster springs not shown.

The bearing 200 is provided with a slot 221, said slot occupying an area in excess of 180 degrees. A pin 222 extends radially from the left end of the axle 97 and rides within the slot 221 and is adapted to ultimately engage the adjustable stops 223 and 224. The stops may be adjusted so that the shaft 97 may rotate rearwardly through 180 degrees as viewed in Fig. 1. Secured to the shaft 97 next to the bearing 200 is a half-pulley 225 and a flexible element 226 is secured at the lower end thereof to the portion 227 of the half-pulley 225. The flexible element 226 changes its direction about a pulley 228 which is journaled in a support 229 projecting forwardly from the sleeve 203. The upper end of the flexible element 226 is connected to the lower end of a tension spring 230. The opposite end of the spring 230 is connected to a support 231 extending forwardly from the detent 207. The spring 230 is relatively stiff. The flexible element 226 may take the form of a steel cable, or may be a chain. The action of the flexible element 226 is such that starting with the position shown in Fig. 1 and Fig. 2, as the carriage 199 is lowered by the movement of the toggles 209 and 210, the lower end of the element 226 lying within the groove 232 pulls the half-pulley in a clockwise direction as shown in Fig. 2 so that the element 47 passes through an intermediate position indicated by the dot dash lines on said figure. Continued downward movement of the carriage 199 causes the surface 235 on the housing 63 to contact the surface 234 on the housing 62. This situation occurs before the toggles 209 and 210 align so that the last portion of the downward movement of the carriage 199 results in the movement of the piston 80 and the parts connected thereto from the position shown in Fig. 8 to that shown in Figs. 4 and 7. Relief in the tension of the element 226 during this last described movement is provided by the spring 230 accompanied by a compression of the spring 137.

The control for the valve 88 which may be of the electrically operated solenoid type, is the switch 236, which opens the valve 88 when the plunger and roller thereof are moved to the left as viewed in Fig. 1. This is accomplished by a cam 237 which is moved downwardly by the pedal 59. The valve 127 is also of the electrically operated type and is controlled by the switch 238. Switch 238 is closed by the cam 239. The pedal 59 is pivotally mounted at the forward end thereof by a hinge 240 upon the floor 57. The cams 237 and 239 are mounted upon the carrier 241 which is suitably arranged for vertical reciprocation and at the lower end thereof is hingedly connected to the rear end of the pedal 59. The switch 242 is in series with the conductor 183 leading to the switches 236 and 238. The conductors 155 and 156 connect the valves 88 and 127 with the switches 236 and 238 respectively. The lever 211 carries a cam 243 which acts upon the roller and plunger of the switch 242 to open-circuit said switch when the pedal 60 is in a rearward position thereof; that is to say when the housings 62 and 63 have the surfaces 234 and 235 in contact.

Operation

In one manner of operation, the motor 244 is connected to the power source 250 by the conductors 249 and the compressor builds up the required pressure and vacuum. The values of pressure and vacuum are regulated in any suitable manner as by automatic safety valves (not shown) which operate when predetermined levels are reached. With the parts as seen in Fig. 8, plush blanks or casing elements 22 and 21 are placed upon the guide rings 109 and 110 respectively with their outer edges 30 and 29 inwardly of the guide shoulders 112 and 111 respectively. The casing elements 21 and 22 will now appear as shown in Fig. 2. If the casing elements are composed of relatively soft material, they may sag slightly in the center owing to gravity but this need not change the general position thereof. The casing elements 21 and 22 are placed upon the guide rings 110 and 109 respectively with the pile surfaces down so that these plush or velour surfaces will be outermost in the finished puff. This operation may be simultaneously performed by the operator using the left hand to place the element 21, and the right hand to place the element 22. Next the pad elements 25 and 26 are placed centrally upon the casing elements 21 and 22 respectively. This is indicated by the dot dash lines on Fig. 2.

Following this, the operator presses down upon the pedal 59. The cam 237 engages the switch 236 which connects the lines 86 and 87 with the vacuum line 90. This produces reduced pressure in the chambers 70 and 71 and the casing elements 21 and 22, as well as the pad elements 25 and 26 are pulled into the position shown in the dash-double-dot lines in Fig. 2. As an alternative the pedal 59 may have been partially depressed so as to produce the suction before the pad elements 25 and 26 are put into position.

At this stage the tabs 33 and 34 are substantially perpendicular (see the dot dash lines in Fig. 13). Continued downward movement of the pedal 59 brings the cam 239 down so that it causes a contact of short duration within the switch 238. This quickly opens and closes the valve 127 so that the tubes 123 and 124 push the fingers 101 and 102 into their active positions from which they quickly retreat. The fingers bend the tabs 33 and 34 inwardly an amount sufficient so that they are caught within the flow of air, leaving the die elements 74 and 75 through the air holes 82 through 85 inclusive. This results in the tabs being moved to the position shown in the full lines in the Figs. 13 and 14.

Continued downward movement of the pedal 59 results in no change of this general condition; the reduced air pressure within the chambers 70 and 71 being continued by the length of the cam 237. At this stage a layer of cement or a ring of thermo-plastic cement such as that indicated by reference character 50 in Fig. 13 is placed upon the then uppermost surface of the tabs 34.

Following this the pedal 60 is moved rearwardly and this results in the inversion of the element 47, the upper puff half being maintained in position by the relative vacuum in the upper housing 63. Traveling through the dot dash position of Fig. 2, the element 47 comes to rest so that the surface 235 contacts the surface 234 (see Fig. 8). Continued movement of the pedal 60 brings the piston 80 down so that the pressure head 81 brings the then upper puff half down into contact with the lower half (see Fig. 7). In this position of the parts, pressure is maintained for a sufficient period of time and to a sufficient degree to assure the adherence of the two puff halves produced by the cement layer. While in this position the pressure and suction has been cut off by the actuation of the switch 242 which opens the circuit to the valves 88 and 127. Bleeding of pressure or vacuum may be accomplished in the valves when they are moved to their closed positions so that the lines 87 and 99 may return to a normal atmospheric pressure in a suitable manner.

The operator may now release pressure from the pedal 59 and following this release pressure from the pedal 60, whereupon the parts will return to their original position of Fig. 1 and the now integrated puff 20 will lie within the die element 72. From here it may be manually removed and deposited in a suitable container (not shown). If desired air pressure may be introduced into the chamber 70 (by means not shown) so as to blow the finished product out of the way to prepare the machine for the next cycle.

The production of heat is shown to be accomplished by the heating element 149 and this assists in the drying of the cement or promotes fusion of a heat activated cement. Where desired the die 72 may be furnished with similar heat means.

While the die elements 72 and 73 are of circular shape so as to produce a round puff 20, obviously other shapes may be used such as octagonal, square or irregular. Because the size of the puff is materially affected by the size of the dies 72 and 73, the puffs produced are of substantially accurately predetermined size. This offers an improvement in uniformity on prior art products and enables the finished puff to properly fit an accurately sized container or box.

By the substitution of a smaller casing element such as the casing element 21a and the omission of the pad element 25, a flat backed puff such as that shown in Fig. 14 may be obtained. Similarly, the ribbon 42b may be placed beneath a casing element 21b as the puff 20b is assembled so as to produce a puff having a handle. Also by the use of the present machine the form of puff shown in Fig. 15 may be fabricated.

It may thus be seen that we have disclosed novel and useful powder puff constructions, methods of making the same, and means for such purposes. We wish it to be understood that we do not desire to be limited to the exact details of construction shown and described, for obvious modifications will occur to a person skilled in the art.

We claim:

1. In a powder puff making device, for use with a powder puff casing element in the form of a substantially flexible and planar blank of an effective diameter or width greater than the effective diameter or width of the finished puff: a die element having a bottom surface and upstanding rim, the distance between opposed portions of said rim being approximately the size of the finished puff; pneumatic means to move the central portion of said blank into contact with said bottom surface, whereby the edge of said blank is brought into contact with the inner surface of said rim; and a reciprocable finger in said rim adapted in the active position thereof to lie inwardly of said die so as to move the edge of the puff blank farther into the pneumatic flow produced by said pneumatic means.

2. A device as claimed in claim 1 including means to reciprocate said finger.

3. In a machine for manufacturing powder puffs, a die element having a bottom wall and a side wall, said die element having a diameter less than that of a powder puff casing blank which is placeable over the mouth of said die element, means for applying suction through a wall of said die element, means for forcing said powder puff blank into the die element to take the contour of the same and for holding the thus shaped blank in the die element by the suction flow applied through said wall of the die element, and means for inbending the periphery of the said shaped blank which extends at the mouth of said die element.

4. A machine for making powder puffs comprising two forming mechanisms, each for forming a half of a powder puff casing, means for moving said mechanisms towards and away from each other in the operation of uniting said halves to form the completed powder puff, each of said mechanisms comprising a die element having a bottom wall and a side wall, said die element having a diameter less than that of a powder puff casing blank which is placeable over the mouth of said die element, means for applying suction through a wall of said die element, means for forcing said powder puff blank into the die element to take the contour of the same and for holding the thus shaped blank in the die element by the suction flow applied through said wall of the die element, and means for inbending the periphery of the said shaped blank which extends at the mouth of said die element.

5. In a machine for manufacturing powder puffs, a die element having a bottom wall and a side wall, said die element having a diameter less than that of a powder puff casing blank which is placeable over the mouth of said die element, means for applying suction through a wall including a peripheral region of said die element, means for forcing said powder puff blank into the die element to take the contour of the same and for holding the thus shaped blank in the die element by the suction flow applied through said wall of the die element, and means for in-bending into said die element the periphery of the said shaped blank which extends at the mouth of said die element, said in-bent periphery being then held in the suction flow at the peripheral region of the die element.

6. A machine for manufacturing powder puffs comprising two forming mechanisms, each for forming a half of a powder puff casing, means for moving said mechanisms towards and away from each other in the operation of uniting said halves to form the completed powder puff, each of said mechanisms comprising a die element having a bottom wall and a side wall, said die element having a diameter less than that of a powder puff casing blank which is placeable over the mouth of said die element, means for applying suction through a wall including a peripheral region of said die element, means for forcing said powder puff blank into the die element to take the contour of the same and for holding the thus shaped blank in the die element by the suction flow applied through said wall of the die element, and means for in-bending into said die element the periphery of the said shaped blank which extends at the mouth of said die element, said in-bent periphery being then held in the suction flow at the peripheral region of the die element.

7. In a machine for manufacturing powder puffs, a die element having a bottom wall and a side wall, said die element having a diameter less than that of a powder puff casing blank which is placeable over the mouth of said die element, means for applying suction through a wall of said die element, said powder puff blank being movable into the die element to take the contour of the same, the thus shaped blank being adapted to be held in the die element by the suction flow applied through said wall of the die element, and means for in-bending the periphery of the said shaped blank which extends at the mouth of said die element.

8. The apparatus of claim 7 in which the bottom wall of the die element is axially movable with respect to the side wall, and means for relatively moving said bottom and side walls.

9. A machine for manufacturing powder puffs comprising two forming mechanisms, each for forming a half of a powder puff casing and each comprising the apparatus of claim 7, and means for moving the said two mechanisms towards and away from each other in the operation of uniting said halves to form the completed powder puff.

10. In a machine for manufacturing powder puffs, a die element having a bottom wall and a side wall, said die element having a diameter less than that of a powder puff casing blank which is placeable over the top of said die element, means for applying suction through a wall including a peripheral region of said die element, said powder puff blank being movable into the die element to take the contour of the same, the thus shaped blank being adapted to be held in the die element by the suction flow applied through said wall of the die element, and means for in-bending the periphery of the said shaped blank which extends at the top of said die element, said in-bent periphery being held in the suction flow at the peripheral region of the die element.

11. The apparatus of claim 10 in which the bottom wall and the side wall of the die element are movable axially relatively to each other.

12. A machine for manufacturing powder puffs comprising two forming mechanisms, each for forming a half of a powder puff casing and each comprising the apparatus of claim 10, and means for moving the said two mechanisms towards and away from each other in the operation of uniting said halves to form the completed powder puff.

13. In a machine for manufacturing powder puffs, a shallow cup-shaped die element having a diameter less than that of a powder puff casing blank which is placeable over the top of said die element, means for applying suction through a wall of said die element, said powder puff blank being movable into the die element to take the contour of the same, the thus shaped blank being adapted to be held in the die element by the suction flow applied through said wall of the die element, and means for in-bending the periphery of the blank which extends at the top of said die element.

SEYMOUR EPSTEIN.
ROGER BIHLER.

REFERENCES CITED

The following references are of record in the file of this patent:

UNITED STATES PATENTS

| Number | Name | Date |
|---|---|---|
| 643,236 | Rogers | Feb. 13, 1900 |
| 689,157 | Berstorff | Dec. 17, 1901 |
| 900,276 | Geffers | Oct. 6, 1908 |
| 1,358,582 | Salisbury | Nov. 9, 1920 |
| 1,503,748 | Curioni | Aug. 5, 1924 |
| 1,530,547 | Curioni | Mar. 24, 1925 |
| 2,007,548 | Sampson | July 9, 1935 |
| 2,185,386 | Valentine | Jan. 2, 1940 |
| 2,236,472 | Freydberg | Mar. 25, 1941 |
| 2,357,392 | Francis | Sept. 5, 1944 |
| 2,357,867 | Babbitt | Sept. 12, 1944 |
| 2,385,147 | MacDonald | Sept. 18, 1945 |